(12) United States Patent
Dillinger

(10) Patent No.: US 11,427,118 B2
(45) Date of Patent: Aug. 30, 2022

(54) HEADREST FOR A VEHICLE SEAT

(71) Applicant: Adient Luxembourg Holding S.á r.l., Luxembourg (LU)

(72) Inventor: Thomas Dillinger, Ratingen (DE)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 14/915,710

(22) PCT Filed: Aug. 27, 2014

(86) PCT No.: PCT/EP2014/068127
§ 371 (c)(1),
(2) Date: Mar. 1, 2016

(87) PCT Pub. No.: WO2015/028486
PCT Pub. Date: Mar. 5, 2015

(65) Prior Publication Data
US 2016/0193946 A1   Jul. 7, 2016

(30) Foreign Application Priority Data

Sep. 2, 2013  (DE) .................... 10 2013 014 479.5

(51) Int. Cl.
*B60N 2/888*   (2018.01)
*F42B 3/04*   (2006.01)
*B60N 2/865*   (2018.01)

(52) U.S. Cl.
CPC ............. *B60N 2/888* (2018.02); *B60N 2/865* (2018.02); *F42B 3/04* (2013.01)

(58) Field of Classification Search
None
See application file for complete search history.

(56) References Cited

U.S. PATENT DOCUMENTS 4,597,446 A * 7/1986 Helderle ................. E21B 23/02
166/217
5,293,752 A * 3/1994 Nagao ....................... F25B 9/14
250/352

(Continued)

FOREIGN PATENT DOCUMENTS

CN   101 795 892 A   8/2010
CN   103 068 627 A   4/2013

(Continued)

OTHER PUBLICATIONS

Chinese Office Action dated Sep. 1, 2016.

*Primary Examiner* — David E Allred
(74) *Attorney, Agent, or Firm* — Marshall & Melhorn, LLC

(57) ABSTRACT

A vehicle seat headrest has a first sub-piece facing a seat occupant head, a second sub-piece and an energy storage device with a trigger actuator arranged between the first sub-piece and the second sub-piece. The first sub-piece is moveable relative to the second sub-piece out of a use position into a safety position along a movement direction towards the a seat occupant head as a result of an accident under the effect of a discharge of the energy storage device, which is actuated by the trigger actuator. The headrest is configured such that the volume of an expansion area is increased while the first sub-piece is moved relative to the second sub-piece as a result of an accident and by the effect of the discharge of the energy storage device. The headrest has a sealing device between the first sub-piece and the second sub-piece to delimit the expansion area.

18 Claims, 1 Drawing Sheet

(56) References Cited

U.S. PATENT DOCUMENTS

| | | | | |
|---|---|---|---|---|
| 5,392,960 A * | 2/1995 | Kendt | ........................ | B67D 1/06 |
| | | | | 222/129.1 |
| 6,244,398 B1 * | 6/2001 | Girvin | .............. | B60G 17/01941 |
| | | | | 188/282.5 |
| 7,992,932 B2 * | 8/2011 | Hartlaub | .............. | B60N 2/4228 |
| | | | | 297/216.12 |
| 8,408,644 B2 * | 4/2013 | Frose | .................... | B60N 2/888 |
| | | | | 297/216.12 |
| 8,491,052 B2 * | 7/2013 | Werner | .................. | B60N 2/888 |
| | | | | 297/216.12 |
| 8,814,265 B2 * | 8/2014 | Froese | .................... | B60N 2/865 |
| | | | | 297/216.12 |
| 8,979,202 B2 * | 3/2015 | Schmitz | ................. | B60N 2/888 |
| | | | | 297/408 |
| 9,956,938 B2 * | 5/2018 | Abe | ........................ | B60R 21/38 |
| 10,525,928 B2 * | 1/2020 | Farooq | .................... | B60R 21/34 |
| 2002/0060078 A1 * | 5/2002 | Cook | .................. | B21D 39/203 |
| | | | | 166/380 |
| 2008/0252113 A1 * | 10/2008 | Alexander | ............. | B60N 2/832 |
| | | | | 297/216.12 |
| 2008/0272631 A1 * | 11/2008 | Hartlaub | ................ | B60N 2/853 |
| | | | | 297/216.12 |
| 2011/0221178 A1 * | 9/2011 | Lane, Jr. | ............. | B60R 22/1952 |
| | | | | 280/806 |
| 2012/0101688 A1 * | 4/2012 | Sugiyama | ............... | B60R 21/18 |
| | | | | 701/45 |
| 2014/0265288 A1 * | 9/2014 | Kohlndorfer | ....... | B60R 22/1952 |
| | | | | 280/806 |

FOREIGN PATENT DOCUMENTS

| | | |
|---|---|---|
| DE | 10 2004 016 474 B3 | 8/2005 |
| DE | 10 2008 011324 B3 | 4/2009 |
| DE | 10 2008 011325 A1 | 9/2009 |
| EP | 0 974 484 A2 | 1/2000 |
| WO | 2007/056640 A2 | 5/2007 |
| WO | 2011/154150 A1 | 12/2011 |
| WO | 2012/022386 A1 | 2/2012 |

\* cited by examiner

HEADREST FOR A VEHICLE SEAT

CROSS REFERENCE TO RELATED APPLICATIONS

This application is a United States National Phase Application of International Application PCT/EP2014/068127 filed Aug. 27, 2014 and claims the benefit of priority under 35 U.S.C. § 119 of German Patent Application 10 2013 014 479.5 filed Sep. 2, 2013, the entire contents of which are incorporated herein by reference.

FIELD OF THE INVENTION

The present invention relates to a headrest for a vehicle seat, wherein at least one sub-piece of the headrest facing the head of the seat occupant is able to be moved out of a use position into a safety position toward the head of the seat occupant as a result of an accident under the effect of the release of energy of an energy storage device.

BACKGROUND OF THE INVENTION

Such headrests are also denoted as active headrests or as crash-active headrests. Such active headrests have a mechanism and/or are assigned to such a mechanism which is able to reduce or entirely eliminate the space and/or distance generally present between the back of the head of a seat occupant located in a typical seating position and a headrest, in the case of an accident situation in which, in particular, the vehicle accelerates with negative acceleration values, i.e. typically in the case of a rear impact on the vehicle.

An example of such a headrest is disclosed in the publication DE 10 2004 016 474 B3. In this case, sub-pieces of the headrest are moved apart in a telescopic manner in order to adopt a safety position of the headrest. Moreover, a deployment mechanism for a headrest is disclosed in the publication WO 2007/056640 A2, as well as a trapezoidal component in WO 2012/022386 A1.

A drawback with the known active headrests is that they have a relatively large constructional space, in particular in the longitudinal direction, i.e. in the normal viewing direction of a seat occupant of the vehicle seat.

SUMMARY OF THE INVENTION

An object of the invention is to provide a headrest having a drive device and/or an energy storage device which is effective and of simple and compact construction, wherein the constructional space requirement and the weight of the drive device and/or of the energy storage device and/or the headrest as a whole is relatively low and, in particular, the constructional space requirement in the longitudinal direction is particularly small, i.e. the headrest is of particularly flat construction.

This object is achieved by a headrest for a vehicle seat, wherein the headrest has at least one first sub-piece which faces the head of a seat occupant, wherein the headrest has a second sub-piece, wherein at least one energy storage device with a trigger actuator is arranged between the first sub-piece and the second sub-piece, wherein the first sub-piece is able to be moved—relative to the second sub-piece—out of a use position into a safety position along a movement direction toward the head of the seat occupant as a result of an accident under the effect of a discharge of the energy storage device which is actuated by means of the trigger actuator, wherein the headrest is configured such that the volume of an expansion area is increased while the first sub-piece is moved relative to the second sub-piece as a result of an accident and by means of the effect of the discharge of the energy storage device, wherein the headrest has a sealing means between the first sub-piece and the second sub-piece in order to delimit the expansion area.

As a result, according to the invention it is advantageously possible to provide a headrest which is comfortable in the use position and which in the case of an accident is able to protect a seat occupant rapidly, actively and safely from a whiplash injury, or at least reduce a whiplash injury, by the headrest being provided with the possibility of setting the use position and the safety position. The headrest according to the invention is able to be produced in a simple manner and above all to be compact in terms of constructional space, in particular compact in terms of constructional space in the longitudinal direction of the vehicle.

The energy storage device is provided, in particular, as a gas generator, in particular as a micro gas generator, in particular as a lead-wire micro gas generator or as a pin-type micro gas generator. A gas generator typically contains an ignition unit and a propellant. Alternatively, the energy storage device may also be configured as a heat generator or thermal generator or compact heat generator or compact thermal generator. Such a heat generator or thermal generator generally substantially comprises an igniter which does not actually generate any gas.

For the general construction and function of such active headrests, reference is expressly made to the publication DE 10 2004 016 474 B3 and the disclosure thereof is made with reference to the disclosure of the present patent application.

According to a preferred embodiment of the headrest according to the invention the energy storage device and the actuator form a structural unit, in particular in the form of a gas generator or a heat generator or a thermal generator or a compact gas generator or a compact heat generator or a compact thermal generator.

As a result, it is advantageously possible to use standard components and such that the headrest according to the invention is able to be produced in a simple and cost-effective modular manner. Particularly preferably, the trigger actuator and the energy storage device are designed in one piece and/or as a structural unit, quite particularly preferably the energy storage device is at the same time the actuator, in particular a small gas generator and/or a small (compact) heat generator and/or thermal generator. As a result it is advantageously possible to make savings as regards the components and thus to produce the headrest according to the invention in an even more cost-effective manner.

According to a further preferred embodiment, it is provided that the energy storage device is a pyrotechnical energy storage device.

According to an even further preferred embodiment, it is provided that the headrest has a displacement means for displacing the first sub-piece from the use position into the safety position.

Preferably, in the case of an accident the displacement means is actuated by the energy storage device such that the displacement means displaces the first sub-piece into the safety position. Quite particularly preferably, the headrest has a reinforcement means, in particular made of metal, wherein the reinforcement means is preferably connected to the first sub-piece and/or to the second sub-piece and/or to the displacement means. As a result, it is advantageously possible that the adjustment from the use position may be undertaken in a safe manner and that, even in the case of the action of significant forces, the headrest remains functional and, in particular, does not itself represent a danger to the seat occupant by the risk of fracture.

Even more preferably according to the invention, the displacement means is configured so as to be able to be latched to the first sub-piece and/or to the second sub-piece, in particular when the first sub-piece is moved into the safety position of the first sub-piece relative to the second sub-piece.

Preferably, the displacement means comprises a first latching means, in particular, an asymmetrical tooth-like structure, a movable second latching means, in particular a pin means, engaging therein in a positive and/or non-positive manner. As a result, it is advantageously possible that an inadvertent adjustment of the headrest from the use position into the safety position is prevented.

According to a further preferred embodiment of the headrest according to the present invention, it is provided that the sealing means is an O-ring or a plurality of O-rings.

According to a further preferred embodiment of the headrest according to the present invention, it is provided that
- a first O-ring is arranged between the displacement means and the first sub-piece and
- a second O-ring is arranged between the displacement means and the second sub-piece. As a result, in the case of an accident the displacement means may form a part of the expansion area, wherein the first and the second O-ring ensure that a sealing of the expansion area required for effective expansion is ensured relative to the surroundings. By the additional contribution of the displacement means, when the first and second sub-pieces have the same dimensions, an increase in a displacement path along which the first or second sub-piece is moved in the case of an accident may be effected by the displacement means.

According to a further preferred embodiment of the headrest according to the present invention, it is provided that the headrest has a channeling device for channeling the overpressure originating from the pyrotechnical energy storage device. By means of the channeling device the overpressure is provided such that the effect of the overpressure is advantageously converted primarily into a movement of the first sub-piece in the direction of the forward displacement movement. For example, the channeling device comprises a funnel-like component which is adjoined to the pyrotechnical energy storage device by an inlet opening and is oriented toward the first sub-piece by an outlet opening, wherein the outlet opening is larger than the inlet opening. As a result, the sealing of the expansion area may be performed effectively by simple means.

Furthermore, according to a further embodiment according to the invention it is also provided that the headrest
is arranged integrated in a vehicle seat or
is connected via a pair of retaining rods to a seat backrest of a vehicle seat.

As a result, it is also possible according to the invention to use the headrest design of the present invention in different seating configurations.

Moreover, according to a preferred embodiment the first sub-piece comprises at least one upholstery element.

As a result, a greater degree of comfort is advantageously permitted for the seat occupant of the vehicle seat.

According to the invention, it is further preferred that the second sub-piece is configured so as to be adjustable relative to the vehicle seat or relative to the seat backrest of the vehicle seat, in particular so as to be able to be displaced in the longitudinal direction.

Moreover, it is preferred according to the invention that the release of energy of the energy storage device and/or the actuation of the trigger actuator is able to be controlled and/or triggered by an accident and/or safety sensor of the vehicle.

As a result, according to the invention it is advantageously possible that the headrest according to the invention is integrated in an existing safety system of a vehicle and/or that the headrest is moved from the use position into the safety position only in the case of an accident with the potential to cause whiplash.

Further details, features and advantages of the invention are disclosed from the drawings as well as the following description of preferred embodiments with reference to the drawings. In this case, the drawings merely illustrate exemplary embodiments of the invention which do not limit the essential idea of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
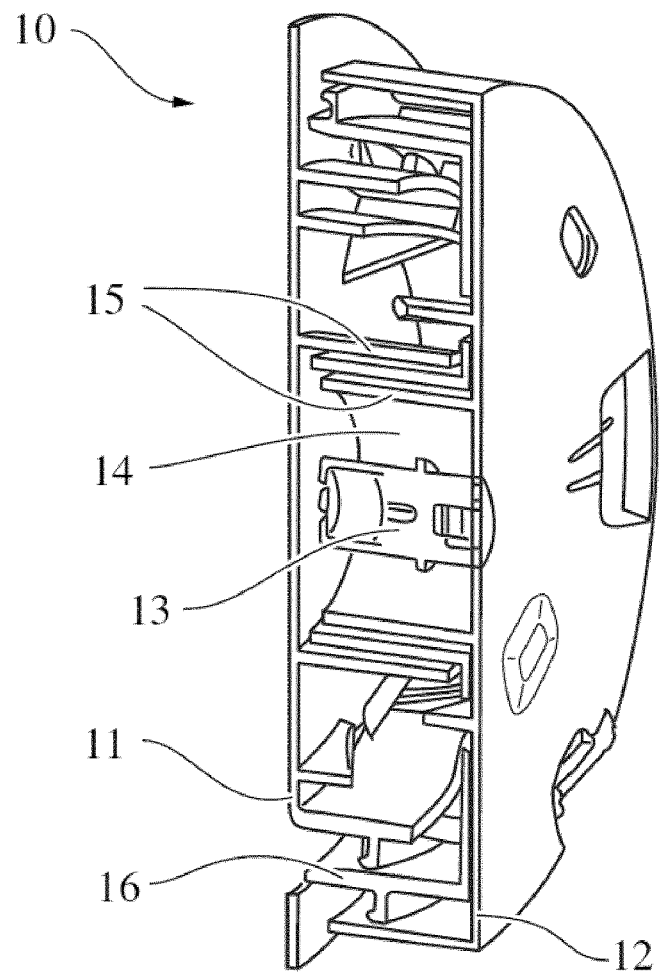
FIG. 1 is a schematic perspective sectional view of a portion of a headrest according to an embodiment of the presently described subject matter, including first and second sub-pieces, wherein the first sub-piece is shown in a first position.

The same parts are always provided with the same reference numerals in the various Figures and, therefore, are generally cited and/or mentioned only once in each case.

According to FIG. 1, a headrest 10 according to the invention comprises a first sub-piece 11 and a second sub-piece 12. The first sub-piece 11 faces the head of the seat occupant and is moved out of a use position into a safety position along a movement direction toward the head of the seat occupant as a result of an accident under the effect of a discharge of an energy storage device 13.

The energy storage device 13, in particular, is activated by means of a trigger actuator and forms with the trigger actuator a structural unit.

In particular, the energy storage device 13 and the trigger actuator are arranged between the first sub-piece 11 and the second sub-piece 12 of the headrest 10.

The first sub-piece 11 is, in particular, an upholstery element (and/or the first sub-piece 11 has an upholstery element), the head of the seat occupant being able to be placed and/or supported thereon.

Figure 2:
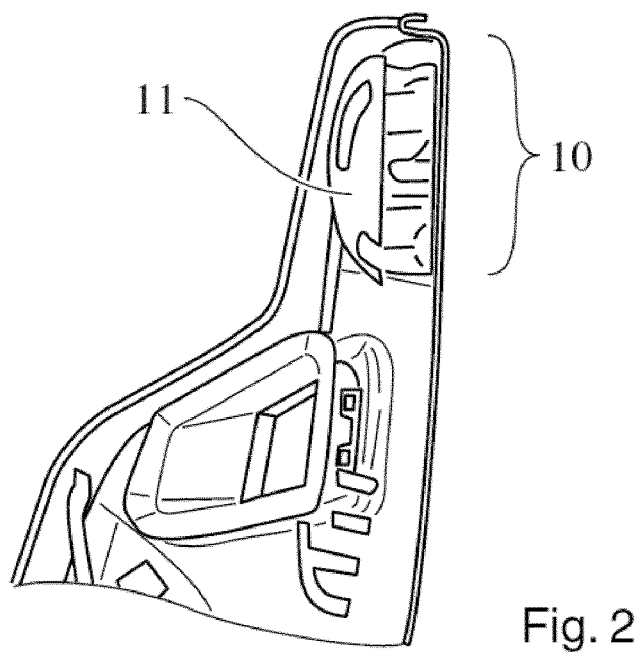
FIG. 2 is a perspective view a part of a vehicle seat having a headrest according to an embodiment of the presently described subject matter.

The second sub-piece 12 of the headrest 10, in particular, is a base body of the headrest 10 which—as shown in FIG. 2—either is integrated in the vehicle seat and/or in the backrest thereof or—as an alternative—is connected to the backrest of the vehicle seat via retaining rods in a rigid manner or even in a manner in which the height and/or inclination is adjustable.

The triggering of the energy storage device 13 between the first sub-piece 11 and the second sub-piece 13 effects the displacement of the first sub-piece 11 in the direction of movement toward the head of the seat occupant. The trigger actuator may be connected, for example, to the vehicle electronics system and in the case of an accident may be triggered by accident sensors and/or safety sensors.

According to the invention, an expansion area 14 is configured in the headrest 10 between the first sub-piece 11 and the second sub-piece 12. The energy storage device, in particular in the form of a gas generator or a heat generator and/or thermal generator, is arranged inside the expansion area 14 and/or connected to the expansion area 14. With an activation (in particular by the trigger actuator) of the gas generator or the heat generator and/or thermal generator, an overpressure is produced abruptly in the expansion area 14. This overpressure—relative to the second sub-piece 12—causes a movement of the first sub-piece 11 toward the head of the vehicle seat occupant.

According to the invention it is provided, in particular, that a displacement means 16 is provided between the first sub-piece 11 and the second sub-piece 12, said displacement means being attached to the first sub-piece 11 via a helical connection such that a rotational movement of the first sub-piece 11 relative to the displacement means 16 leads to a relative movement of the first sub-piece 11 toward the head of the occupant of the vehicle seat and said displacement means also being attached to the second sub-piece 12 via a further helical connection such that a rotational movement of the displacement means relative to the second sub-piece 12 leads to a relative movement of the displacement means 16 relative to the second sub-piece 12 toward the head of the occupant of the vehicle seat.

The expansion area 14 according to the invention is provided to be sealed, in particular for example by means of one sealing means or a plurality of sealing means, in particular rubber elements, particularly preferably an O-ring or a plurality of similar or different O-rings. In particular, it is preferred that a sealing means 15, in particular an O-ring, is arranged between the first sub-piece 11 and the displacement means 16 and a sealing means 15, in particular an O-ring, is also arranged between the displacement means 16 and the second sub-piece 12.

While specific embodiments of the invention have been shown and described in detail to illustrate the application of the principles of the invention, it will be understood that the invention may be embodied otherwise without departing from such principles.

What is claimed is:

1. A headrest for a vehicle seat, the headrest comprising:
at least one one-piece first sub-piece which faces a head of an occupant of the vehicle seat, the at least one first sub-piece including a first sub-piece radially inner portion;
a second one-piece sub-piece configured to cooperate with the at least one first sub-piece to form an expansion area therebetween, wherein the at least one first sub-piece is moveable relative to the second sub-piece from a first position to a second position in a direction toward the head of the occupant, and wherein the second sub-piece includes a second sub-piece radially inner portion extending axially outwardly towards the at least one first sub-piece and a second sub-piece radially outer portion extending axially outwardly towards the at least one first sub-piece; and
a displacement means for guiding a displacement of the at least one first sub-piece from the first position into the second position, the displacement means including a displacement means portion, wherein a volume of the expansion area is increased with the at least one first sub-piece moved relative to the second sub-piece to the second position, wherein the displacement means portion is interposed between the first sub-piece radially inner portion and the second sub-piece radially inner portion, wherein the displacement means radially outwardly surrounds the second sub-piece radially inner portion of the second sub-piece when the at least one first sub-piece is in the first position, wherein the second sub-piece radially outer portion of the second sub-piece radially outwardly surrounds the first sub-piece radially inner portion and the displacement means along an entire circumference of the displacement means when the at least one first sub-piece is in the first position, wherein the displacement means is configured to move relative to the second sub-piece along a longitudinal direction toward the head of the occupant and the first sub-piece is configured to move relative to the displacement means along the longitudinal direction toward the head of the occupant, wherein the first sub-piece radially inner portion is a hub portion into which the displacement means portion protrudes when the at least one first sub-piece is in the first position, and wherein the second sub-piece radially inner portion is a hub portion which protrudes into the displacement means portion when the at least one first sub-piece is in the first position.

2. The headrest as claimed in claim 1, wherein the headrest is one of integrally formed with the vehicle seat and connected by at least one retaining rod to a seat backrest of the vehicle seat.

3. The headrest as claimed in claim 1, wherein the first sub-piece comprises at least one upholstery element.

4. The headrest as claimed in claim 1, wherein the second sub-piece is configured to be adjusted relative to one of the vehicle seat and a seat backrest of the vehicle seat so as to be able to be displaced in a longitudinal direction.

5. The headrest as claimed in claim 1, further comprising at least one sealing means disposed between the displacement means and the second sub-piece radially inner portion.

6. The headrest as claimed in claim 1, wherein the second sub-piece radially outer portion is a generally circular outer wall portion.

7. A headrest for a vehicle seat, the headrest comprising:
a first one-piece sub-piece which faces a head of an occupant of the vehicle seat, the first sub-piece including a first sub-piece radially inner portion;
a second one-piece sub-piece configured to cooperate with the first sub-piece to form an expansion area therebetween, the second sub-piece including a second sub-piece radially inner portion extending axially outwardly towards the first sub-piece and a second sub-piece radially outer portion extending axially outwardly towards the first sub-piece;
a micro gas generator arranged between the first sub-piece and the second sub-piece, the first sub-piece being moveable relative to the second sub-piece from a first position to a second position along a movement direction toward the head of the occupant;
a displacement means for guiding a displacement of the first sub-piece from the first position into the second position, the displacement means including a displacement means portion, wherein a volume of the expansion area is increased with the first sub-piece moved relative to the second sub-piece into the second position, wherein the displacement means portion is interposed between the first sub-piece radially inner portion and the second sub-piece radially inner portion, wherein the displacement means radially outwardly surrounds the second sub-piece radially inner portion when the first sub-piece is in the first position, wherein the second sub-piece radially outer portion of the second sub-piece radially outwardly surrounds the first sub-piece radially inner portion and the displacement means along an entire circumference of the displacement means when the first sub-piece is in the first position, wherein the first sub-piece radially inner portion is a hub portion into which the displacement means portion protrudes when the first sub-piece is in the first position, and wherein the second sub-piece radially inner portion is a hub portion which protrudes into the displacement means portion when the first sub-piece is in the first position.

8. The headrest as claimed in claim 7, wherein the headrest is one of integrally formed with the vehicle seat and connected by at least one retaining rod to a seat backrest of a vehicle seat.

9. The headrest as claimed in claim 7, wherein the first sub-piece comprises at least one upholstery element.

10. The headrest as claimed in claim 7, wherein the second sub-piece is configured to be adjusted relative to one of the vehicle seat and a seat backrest of the vehicle seat so as to be able to be displaced in a longitudinal direction.

11. The headrest as claimed in claim 7, wherein the first sub-piece and the second sub-piece are rotatably connected to the displacement means.

12. The headrest as claimed in claim 7, further comprising at least one sealing means disposed between the displacement means portion of the displacement means and the first sub-piece radially inner portion of the first sub-piece.

13. The headrest as claimed in claim 7, further comprising at least one sealing means disposed between the displacement means portion of the displacement means and the second sub-piece radially inner portion of the second sub-piece.

14. A headrest for a vehicle seat, the headrest comprising:
a first one-piece sub-piece which faces a head of an occupant of the vehicle seat, the first sub-piece including a first sub-piece radially inner portion;
a second one-piece sub-piece configured to cooperate with the first sub-piece to form an expansion area therebetween, the second sub-piece including a second sub-piece radially inner portion extending axially outwardly towards the first sub-piece and a second sub-piece radially outer portion extending axially outwardly towards the first sub-piece;
a micro gas generator disposed in the expansion area, the first sub-piece being moveable relative to the second sub-piece from a first position to a second position along a movement direction toward the head of the occupant, the micro gas generator having a longitudinal axis, wherein the micro gas generator exerts a force in a longitudinal direction on at least one of the first sub-piece and the second sub-piece;
a displacement means for guiding a displacement of the first sub-piece from the first position to the second position, the displacement means including a displacement means portion, wherein a volume of the expansion area is increased with the first sub-piece moved relative to the second sub-piece into the second position, wherein the displacement means portion is interposed between the first sub-piece radially inner portion and the second sub-piece radially inner portion, wherein the displacement means radially outwardly surrounds the second sub-piece radially inner portion when the first sub-piece is in the first position, wherein the second sub-piece radially outer portion of the second sub-piece radially outwardly surrounds the first sub-piece radially inner portion and the displacement means along an entire circumference of the displacement means when the first sub-piece is in the first position, wherein the first sub-piece radially inner portion is a hub portion into which the displacement means portion protrudes when the first sub-piece is in the first position, and wherein the second sub-piece radially inner portion is a hub portion which protrudes into the displacement means portion when the first sub-piece is in the first position;
a first sealing means arranged between the first sub-piece and the displacement means for sealing the expansion area, the first sealing means being located at a first radial distance from the micro gas generator with respect to the longitudinal axis of the micro gas generator;
a second sealing means disposed between the displacement means and the second sub-piece for sealing the expansion area, the second sealing means being located at a second radial distance from the micro gas generator with respect to the longitudinal axis of the micro gas generator, the second radial distance being greater than the first radial distance.

15. The headrest as claimed in claim 14, wherein the second sub-piece is configured to be adjusted relative to one of the vehicle seat and a seat backrest of the vehicle seat so as to be able to be displaced in a longitudinal direction.

16. The headrest as claimed in claim 15, wherein the first sub-piece includes a first sub-piece planar surface and the second sub-piece includes a second sub-piece planar surface, wherein the first sub-piece planar surface is opposite the second sub-piece planar surface, wherein the first sub-piece planar surface and the second sub-piece planar surface define at least a portion of the expansion area.

17. The headrest as claimed in claim 16, wherein the first sealing means and the second sealing means surround the expansion area and the micro gas generator, the first sub-piece radially inner portion extending axially from the first sub-piece planar surface and the second sub-piece radially inner and outer portions extending axially from the second sub-piece planar surface, and wherein the first sub-piece radially inner portion, the second sub-piece radially inner portion, the second sub-piece radially outer portion, and the displacement means portion extend along the longitudinal axis of the micro gas generator.

18. The headrest as claimed in claim 14, wherein the first sub-piece radially inner portion of the first sub-piece radially outwardly surrounds the displacement means portion of the displacement means.

* * * * *